United States Patent
de Labareyre

(10) Patent No.: US 6,460,584 B1
(45) Date of Patent: Oct. 8, 2002

(54) TIRE PROVIDED WITH A PROTUBERANCE FOR DEFLECTING LATERAL SPRAYS

(75) Inventor: Bertrand Garnier de Labareyre, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/558,112

(22) Filed: Apr. 25, 2000

(30) Foreign Application Priority Data

Apr. 29, 1999 (FR) .............................. 99 05590

(51) Int. Cl.$^7$ ..................... B60C 11/01; B60C 11/117
(52) U.S. Cl. ............. 152/154; 152/209.16; 152/209.17; 152/523
(58) Field of Search ..................... 152/154, 209.16, 152/209.17, 523; D12/605

(56) References Cited

U.S. PATENT DOCUMENTS

| | | | |
|---|---|---|---|
| 3,204,681 A | | 9/1965 | Olagnier et al. |
| 3,400,745 A | * | 9/1968 | Schwartz ............... 152/209.16 |
| 3,568,747 A | * | 3/1971 | Fletcher ..................... 152/154 |
| 3,976,115 A | * | 8/1976 | Mirtain et al. ......... 152/209.16 |
| 4,079,768 A | * | 3/1978 | Verdier .................. 152/209.16 |
| 4,262,722 A | * | 4/1981 | Takigawa et al. ...... 152/209.16 |
| 4,356,985 A | | 11/1982 | Yeager et al. |
| 4,671,333 A | * | 6/1987 | Rhode et al. .......... 152/209.16 |
| 4,926,918 A | | 5/1990 | Demor, III et al. |
| 5,522,442 A | * | 6/1996 | Kishi .................... 152/209.16 |
| 5,769,978 A | * | 6/1998 | Lurois ................... 152/209.16 |

FOREIGN PATENT DOCUMENTS

| | | | |
|---|---|---|---|
| AU | 6474674 | 7/1975 | |
| DE | 1041825 | * 10/1958 | ............ 152/209.16 |
| DK | 36062 | * 5/1926 | ................. 152/154 |
| FR | 476457 | * 5/1915 | ................. 152/154 |
| FR | 2336266 | 7/1977 | |
| GB | 785097 | * 10/1957 | ............ 152/209.16 |

OTHER PUBLICATIONS

Patent Abstracts of Japan, Publication No. JP 06143931 dated May 24, 1994, Tire for Two–Wheeler, Sumitomo Rubber Ind Ltd., abstract.

* cited by examiner

Primary Examiner—Steven D. Maki
(74) Attorney, Agent, or Firm—Baker Botts L.L.P.

(57) ABSTRACT

A tire for a heavy vehicle having beads, sidewalls and a crown, the crown having a reinforcement armature formed of at least two working plies, is provided with a protuberance for deflecting sprays. To deflect the flow of water ejected laterally by this tire during travel on water-covered ground, without adversely affecting the thermal level of said tire, provision is made to arrange on at least one of the sidewalls a protuberance which is limited by an upper wall radially to the outside and a lower, wall radially to the inside, the intersection of said walls being along a line joining points C which are located axially farthest to the outside of said protuberance, the angle α between the axial direction and a straight line tangent both to the edge of the tread and to the protuberance being less than 45°. Furthermore, the upper profile of the protuberance intersects the sidewall profile at a point K located within the extension of the average profile of the radially outermost crown ply.

9 Claims, 3 Drawing Sheets

TIRE PROVIDED WITH A PROTUBERANCE FOR DEFLECTING LATERAL SPRAYS

BACKGROUND OF THE INVENTION

The invention relates to tires for highway vehicles of the heavy-vehicle type, and in particular to those tires which are provided with a device for deflecting the lateral sprays of water when a vehicle fitted with said tires travels over a water-covered road surface.

When traveling during rainy weather, the maneuvers of overtaking and passing with a heavy vehicle are frequently very tricky, taking into account the large quantities of water which are sprayed sideways by said vehicle and which, when they reach the windshields of passenger vehicles, considerably reduce the visibility. It has been known for a long time, for example from U.S. Pat. No. 3,204,681, to provide the sidewalls of aircraft tires with projecting elements extending in the circumferential direction over the outer surface of said tires. These elements form protuberances, the role of which is to deflect the trajectory of the flow of sprayed liquid in order to prevent this flow from being sprayed too high towards the engines.

A tire for a heavy vehicle is generally composed of two beads intended to be in contact with a mounting rim, a crown provided with a tread having a running surface which is intended to come into contact with the ground during travel, and two sidewalls which provide the connection between this tread and the beads.

Such a tire is reinforced by a carcass reinforcement extending from one bead to the other and a reinforcement armature for the crown which is located radially to the outside of the carcass reinforcement, this crown reinforcement comprising at least two stacked plies of reinforcements, that is to say, plies which are placed one on the other. Each ply of the crown reinforcement is generally composed of a plurality of reinforcements arranged so as to form an angle from 0° to 70° with the circumferential direction, but it is not however ruled out that the angle of the reinforcements may be greater than 70°.

The tread of a heavy-vehicle tire is provided with a tread pattern formed of elements in relief defined by cutouts (grooves and/or incisions) intended to provide the tire, among other things, with adhesion performance on wet roads.

The tire occupies a space of maximum width L measured at the level of its sidewalls when it is mounted on its mounting wheel and is subjected to its rated conditions of use in terms of pressure and load (L represents the maximum distance between the points of the sidewalls which are axially farthest apart).

It has been observed that by following the conventional rules of adding a protuberance to one of the sidewalls of this tire associated with the hysteretic nature of the rubber mixes forming the tread and the crown, heating of said mixes occurred in the vicinity of the ends of the reinforcement plies of the crown. In particular, the rubber mix serving as a decoupling means between the ends of the working plies works at high temperatures, resulting in a change in the characteristics of said mix and in separation or rupture in this decoupling mix.

SUMMARY OF THE INVENTION

The aim of the tire according to the invention is to achieve good deflection of the flow of liquid sprayed laterally during travel on water-covered ground without causing an increase in the operating temperature of the tire in the tread and in particular in the vicinity of the ends of the reinforcement plies of the crown.

With this aim, the heavy-vehicle tire according to the invention comprises:

two beads intended to be in contact with a mounting rim, a crown provided with a tread having a running surface intended to come into contact with the ground during travel, two sidewalls providing the connection between this tread and the beads, a carcass reinforcement extending from one bead to the other, a reinforcement armature for the crown, located radially to the outside of the carcass reinforcement, this crown reinforcement comprising at least two superposed plies, each ply being provided with reinforcements in the form of cords or cables, a protuberance projecting from at least one of the sidewalls, this protuberance being limited by an upper wall located radially to the outside and a lower wall located radially to the inside, the intersection of said walls occurring along a line joining the points C of this protuberance, on respective sectional planes of the tire, which are located axially farthest to the outside of said protuberance, the angle $\alpha$, measured in a plane containing the axis of the tire, between the axial direction and a straight line tangent both to the edge of the tread and to the protuberance being less than 45°.

Viewed in meridian section, the tire according to the invention is characterized in that:

the point of intersection C of the profiles of the upper and lower walls of the protuberance is located at a distance from the equatorial plane XX which is at most equal to half the distance L between the points M of the sidewalls which are axially farthest when the tire is subjected to its rated conditions of pressure and of load, and the distance of the point C from the axis of rotation is strictly greater than the distance of said points M relative to the same axis, the upper profile of the protuberance extends from the point C and joins the sidewall profile at a point K, said point being defined as the intersection of the outer profile of the tire with the extension of the average profile of the last ply of the crown reinforcement, the angle $\delta$ between a first straight line D1 and a second straight line D2 is greater than or equal to 60°, the first straight line D1 being defined as the straight line passing through the point K and tangent to the upper profile of the protuberance and the second straight line D2 being defined as the straight line passing through the point K and tangent to the profile of the sidewall which extends radially to the outside the upper profile of the protuberance from said point K.

"Sidewall profile" is understood to mean the profile comprising the following three parts of a profile:

part of the sidewall profile joined to one of the beads, part of the sidewall profile joined to the running surface of the tread, outer profile of the protuberance located between the preceding two profiles.

Surprisingly, it has in fact been observed that the position of the connection of the upper surface of the protuberance with the profile of the sidewall close to the running surface has a major effect on the heating above and in the vicinity of the ends of the reinforcement plies of the crown which results from the stresses withstood by a heavy-vehicle tire subjected to rated conditions of use.

The proposed solution makes it possible to optimize both the efficiency with regard to the lateral spraying of water and the endurance of the crown of the tire.

Preferably, and in order not to make the tire too heavy, only the sidewall intended to be mounted on the outer side of the vehicle is provided with a protuberance according to the invention.

Preferably, to obtain effective deflection of the lateral sprays, the angle $\alpha$ of the protuberance lies between 32° and 37°.

In the majority of cases, a heavy-vehicle tire is provided with a tread which itself is provided with a tread pattern composed of a plurality of cutouts, the depth of which is defined according to the desired performance, and in particular according to the acceptable wear limit of said tread. In order to prevent a protrusion fitted on a tire sidewall from rubbing against the ground during the travel of said tire and very substantially reducing the effectiveness of said protuberance in laterally deflecting the flow of liquid, it is advisable to provide for the distance between the running surface of the tire subjected to its rated conditions of use and the point of the upper profile of each protuberance which is located radially farthest to the outside to be at least equal to the permitted maximum depth of wear of the tread.

The effectiveness of the solution proposed is all the greater, the more the part of the tread located in the vicinity of the end of the working plies has the ability to dissipate the heat produced in this region during travel of the tire. For effective dissipation of the heat produced in the tire during travel, it is advantageous to provide for the upper profile of the protuberance, starting from the point of connection K with the sidewall profile, to be formed by a first curved part extending said sidewall profile radially towards the inside starting from said point K, such that said profile of the protuberance is, at least in part, located radially to the inside of the extension of the average profile of the final crown ply.

The average direction of the sidewall profile radially to the outside of said point of connection K corresponds to a direction tangent to the sidewall and passing through the same point K.

DESCRIPTION OF THE DRAWINGS

The invention will be better understood with reference to the variant embodiments which are described using the drawings, in which.

DESCRIPTION OF PREFERRED EMBODIMENTS

Figure 1:
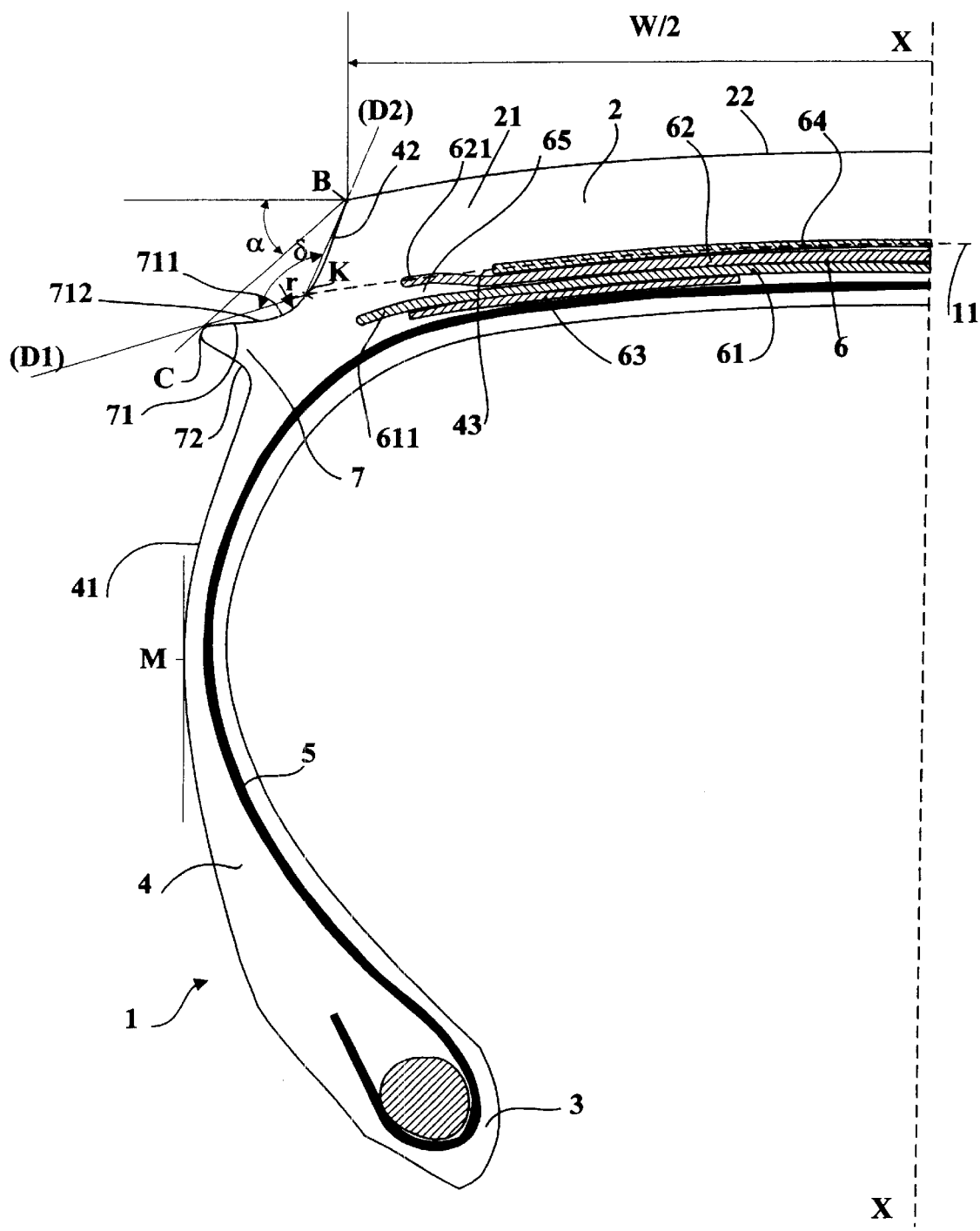
FIG. 1 shows a partial meridian section of a heavy-vehicle tire according to the invention.

FIG. 1 shows a partial section through a heavy-vehicle tire according to the invention, in a meridian plane containing the axis of rotation of said tire. This tire 1, of dimension 315/70 R 22.5, comprises a crown region 2 connected to a bead zone 3 by a sidewall 4.

A carcass reinforcement 5 extends from one bead to the other, and is surmounted radially to the outside in the crown section by a crown reinforcement armature 6, which itself is composed in the present case of two working plies 61 and 62 each formed by a plurality of cables oriented at an average angle of 18° relative to the circumferential direction of the tire. There is furthermore provided:

a ply 63, referred to as a triangulation ply, formed of a plurality of cables oriented at an average angle of 65° with the circumferential direction, between the first working ply 61 and the carcass reinforcement 5, and a ply 64, referred to as a protective ply, composed of a plurality of cables oriented at an average angle of 18° with the circumferential direction, said ply 64 being placed radially to the outside of the working plies. This protective ply is the ply located radially farthest to the outside of the crown reinforcement, and follows a circular average profile 11 at half the thickness of said ply.

To reduce the shearing stresses between the ends 611 and 621 respectively of the working plies 61 and 62, there is provided a thickness h of rubber mix 65 to space apart said ends.

The reinforcement structure 6 is covered radially to the outside by a tread 21 having a running surface 22 of axial width W having, in the sectional plane, an average transverse profile of circular shape, the axially outermost point B of which corresponds to the point of connection with the sidewall profile.

In the meridian sectional plane illustrated, the profile of the sidewall to the outside of the tire is formed of the following three parts:

a virtually rectilinear part 42 which starts at the point B and extends radially towards the inside and axially towards the outside, a part 41 of the profile of the sidewall which is connected to one of the beads 3, the outer profile of the protuberance 7 connecting the preceding two parts of the sidewall profile.

On the sidewall 4, there can be seen a protuberance 7 projecting towards the outside relative to the tire. This protuberance 7 in the present case is formed by molding at the time of the molding and vulcanization of the tire 1; as a variant, provision could be made to attach this protuberance by gluing to a tire sidewall which has been molded without said protuberance.

The protuberance 7 is defined by an upper surface 71 radially to the outside and by a lower surface 72 radially to the inside, the intersection of said two surfaces being effected along a circumferentially extending line, the trace of which on the sectional plane of FIG. 1 corresponds to a point C corresponding to the point of the profile of the protuberance 7 which is located axially farthest to the outside (that is to say, in a direction parallel to the axis of rotation).

This protuberance 7, in the sectional plane, is characterized by the fact that:

a straight line passing through the point B axially farthest to the outside of the running surface 22 and tangent to the profile of the protuberance 7 forms an angle $\alpha$ of 33° with the axial direction, the meridian profile of the upper part 71 is connected at the point K to the rectilinear part 42 of the sidewall by an arc of a circle 711 of radius r of 20 mm, said arc 711 being extended axially towards the outside by a curved part 712 which is parallel to the average transverse profile of the running surface 22 of the tire when new.

The point of connection K is defined as the point of intersection of the sidewall profile with the extension of the average profile of the final ply 64 of the crown reinforcement; when there is a plurality of points of intersection, as is the case in the example described, the point K is the axially innermost point.

Furthermore, the straight line D1 passing through the point K and tangent to the upper profile of the protuberance 7 forms an angle δ of 123° with the straight line D2 passing through the point K and tangent to the profile of the sidewall which extends the profile of the protuberance radially towards the outside.

Numerical simulations were performed to compare the heat level achieved in the decoupling mix of the ends of the working plies 61 and 62 in the case of a tire of dimension 315/70 R 22.5 without protuberance (case A), in the case of a tire of the same dimension provided with a protuberance 7 according to the invention as shown in FIG. 1 (case B) and finally in the case of a tire of the same dimension, provided with a protuberance positioned such that the point of connection of the upper profile of said protuberance is located 7 mm radially to the outside of the extended average profile of the final crown ply (case C).

In Table I hereafter, there are set forth the values of the temperatures obtained for the three cases A, B and C in the decoupling mix for the following operating conditions:

pressure: 8.5 bar;
load: 3482 daN
traveling speed: 80 km/h.

TABLE I

| Case A | Case B | Case C |
|--------|--------|--------|
| 96.6° C. | 95.5° C. | 98° C. |

A second numerical simulation, carried out with the same variants A, B and C on a tire of the same dimension, but provided with a different tread pattern (315/70 R 22.5 XDA) provided results which were fully comparable, as shown by Table II below:

TABLE II

| Case A | Case B | Case C |
|--------|--------|--------|
| 110° C. | 107° C. | 112° C. |

Figure 2:
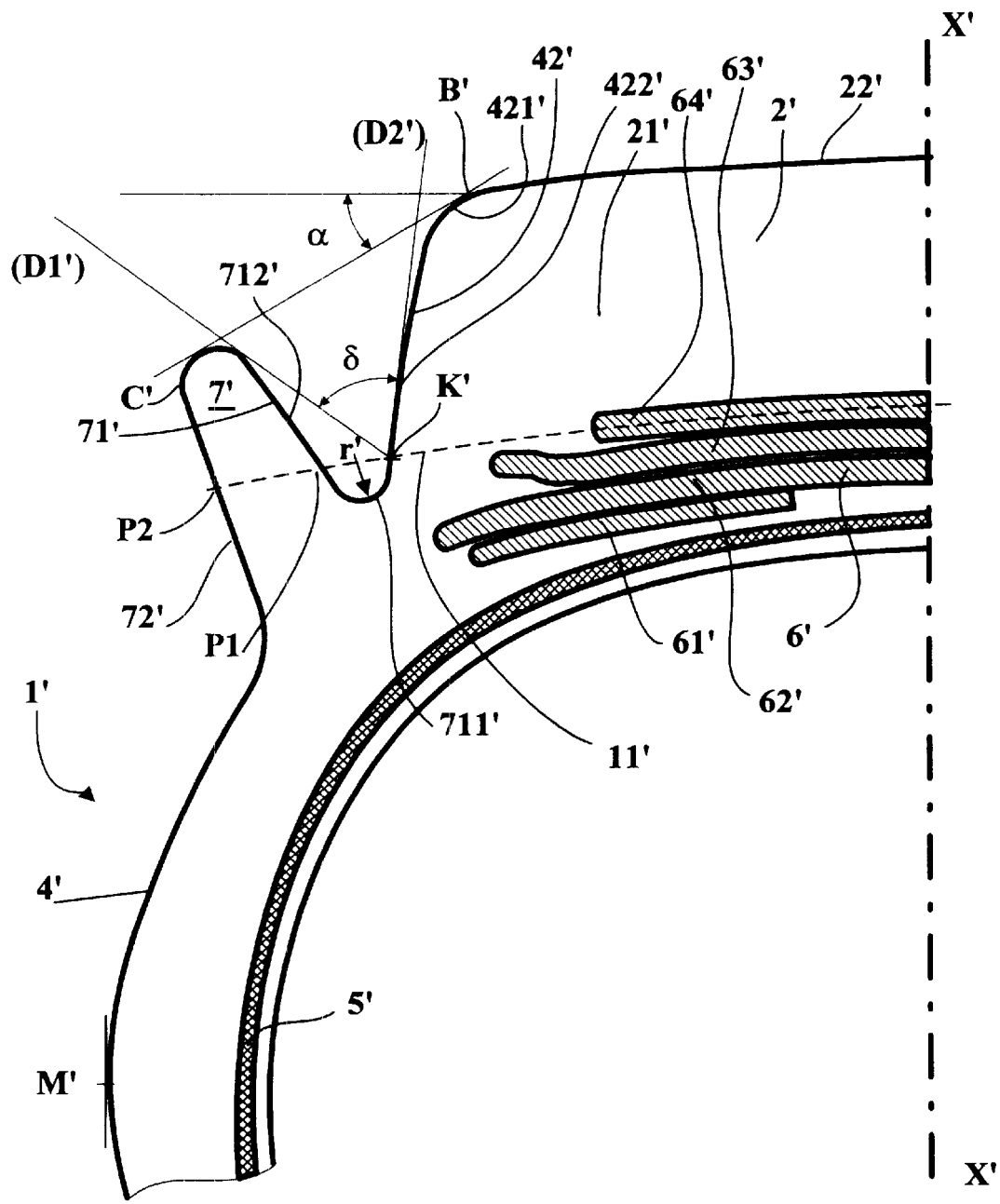
FIG. 2 shows a variant of a tire according to the invention.

In FIG. 2, there is shown, in a meridian sectional plane, a partial view of a variant of a heavy-vehicle tire according to the invention.

The tire 1' shown comprises a crown 2' reinforced by a carcass reinforcement 5', and a reinforcement armature 6' surmounted radially towards the outside by a tread 21'. The reinforcement armature 6' is formed by a stack of the same type as that used in the variant described with reference to FIG. 1 and comprising four plies 61', 62', 63', 64'.

The ply 64' located radially farthest to the outside of the crown reinforcement follows an average profile 11' which is virtually circular and passes at half the thickness of said ply.

The running surface 22' of the tread 21' extends axially between two points B' (corresponding to the axially farthest points which can come into contact with the ground during travel under rated conditions of pressure and load).

The profile of the sidewall 4' is connected to the running surface by an upper part 42' formed of a curved part 421' which originates at the point B', being extended radially towards the inside by a rectilinear part 422' forming an angle of 35° with a direction parallel to the axis of rotation.

A protrusion 7' is provided on one of the sidewalls 4' to deflect the lateral sprays of water during travel on water-covered ground. This protuberance 7' has an upper profile 71' which is connected to the point K' on the upper profile 42' of the sidewall by an arc of a circle 711' of radius r', said upper profile being extended axially towards the outside by a virtually rectilinear part 712'. The point K' is defined as the axially innermost point of intersection of the sidewall profile with the extension of the average profile 11' of the final ply 64' of the crown reinforcement. In the case shown, the extension of the average profile 11' with the sidewall profile furthermore intersects the outer profile of the protuberance at two other points P1 and P2 located axially to the outside relative to the point K'.

In the case in question, the angle δ between the straight line D2' passing through the point K' and tangent to the upper profile 42' of the sidewall and the straight line D1' passing through the same point K' and tangent to the upper profile 71' of the protuberance 7' is equal to 60°.

Of course, in order to satisfy the maximum dimensions of space occupied which the tire must meet, the point C' axially farthest to the outside of the protuberance 7' is at a distance from the equatorial plane XX which is at most equal to half the distance L' between the points M' of the axially farthest sidewalls when the tire is subjected to its rated conditions of pressure and load. Furthermore, for optimum effectiveness of the protuberance 7' in deflecting the flow of liquid, the distance of the point C' from the axis of rotation is strictly greater than the distance of said points M' relative to the same axis.

In order to prevent a protuberance from coming into contact with the ground during travel, whatever the state of wear of the tread (before, however, it reaches its legal limit of use), it is judicious to provide for the point of the upper profile of said protuberance located radially farthest to the outside to be located, when the tire is loaded under its rated conditions of use, at a distance from the ground at least equal to the maximum permissible depth of wear of said tread. As this maximum depth as a general rule is less than the maximum depth of the cutouts, it is preferable for the point of the upper profile of each protuberance located radially farthest to the outside to be distant from the ground by an amount at least equal to the maximum depth of the cutouts of the tread pattern.

Advantageously, and so as not to make the tire provided with at least one protuberance too heavy, and to increase the ventilation of said protuberance, it is beneficial to form a plurality of holes on each protuberance, each of said holes opening only on to a single upper or lower wall of each protuberance in order to prevent water from passing through said protuberance when traveling on water-covered ground.

Advantageously, each protuberance may be provided with a first series and a second series of holes, the first series of holes opening solely on to the upper wall of said protuberance and the second series of holes opening solely on to the lower wall of said protuberance to increase still further the ventilation and thus to obtain a reduction in the temperature in the protuberance and also in the parts of the tread in the vicinity of the ends of the crown plies.

Preferably, excellent ventilation is obtained by producing in each protuberance a plurality of holes opening on to the upper wall and a second plurality of holes opening on to the lower wall, each hole of the first series opening into at least one hole of the second series. The holes opening on to the upper wall of the protuberance are oriented in a first average orientation, and the holes opening on to the lower wall of the protuberance are oriented in a second average orientation, said average directions being different so as to limit the possibility of water passing into said holes.

Figure 3:
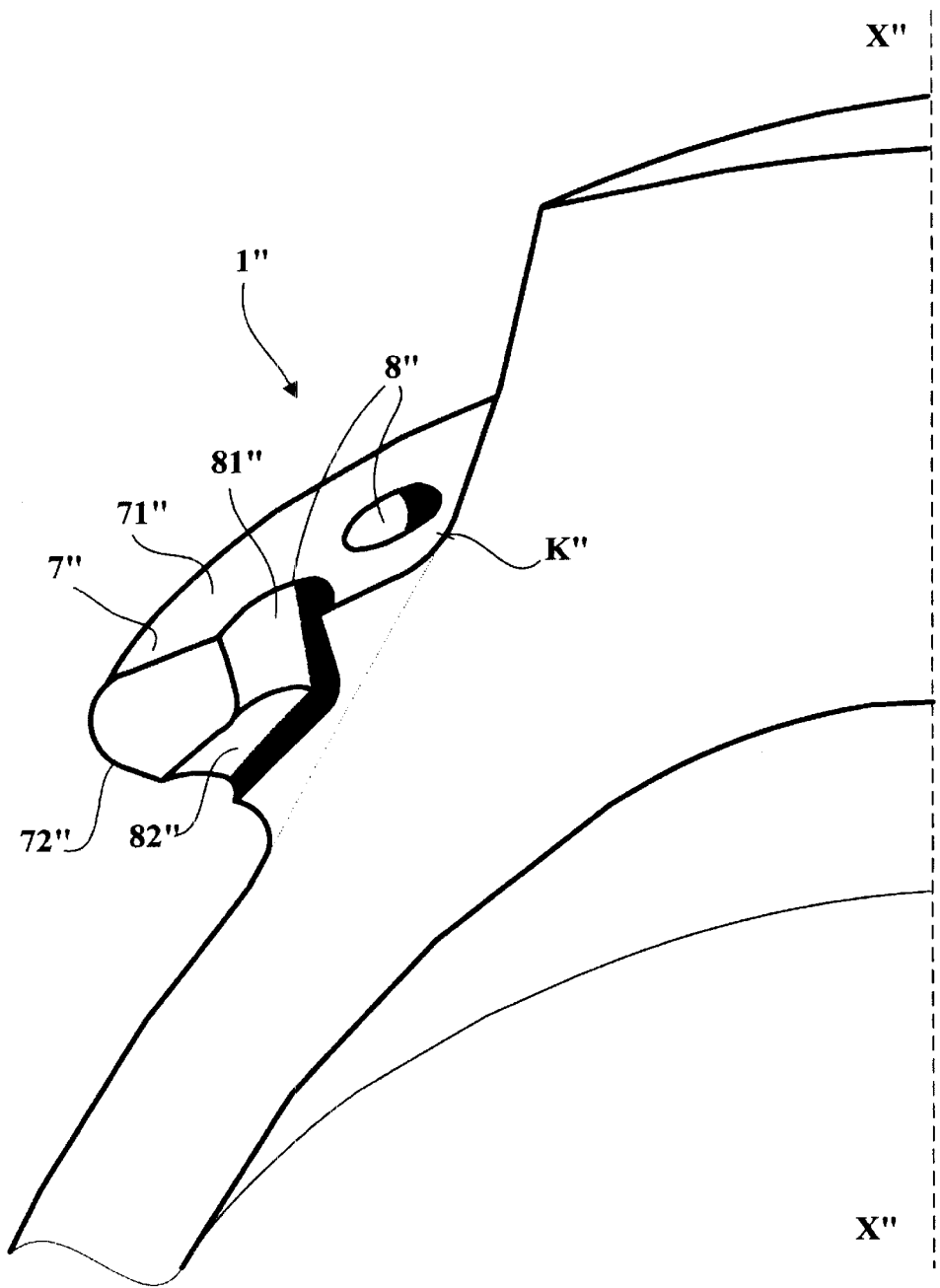
FIG. 3 shows a variant in which the protuberance according to the invention is provided with a plurality of holes.

FIG. 3 shows a partial perspective view of a variant of a tire 1" according to the invention, provided with a protuberance 7" comprising channels 8" which open both on to the upper wall 71" and the lower wall 72" of said protuberance 7". Each channel 8" is formed of a first channel 81" of substantially circular cross-section which opens on to the upper wall 71", and a second channel 82", also of circular cross-section, which opens on to the lower wall 72", said two channels 81" and 82" being connected together so as to form a bend in the plane of the figure to prevent water from circulating readily within said channel (the wall defining each channel forming a screen).

The shape shown in this FIG. 3 is given by way of example, and any other geometric shape may also be suitable.

To restrict the additional weight involved in the presence of a protuberance, the latter may be formed of a plurality of elements in relief regularly spaced in the circumferential direction of the tire, the length of said elements measured in the circumferential direction being at least equal to the distance between each of said elements in the circumferential direction.

Preferably, only the outer side of a tire which is intended to be mounted on a heavy vehicle is provided with a protuberance according to the invention. It may also be envisaged to equip only the front axle of a heavy vehicle with a tire provided with a protuberance according to the invention.

I claim:

1. A heavy-vehicle tire, comprising:
    two beads intended to be in contact with a mounting rim,
    a crown provided with a tread having a running surface intended to come into contact with the ground during travel,
    two sidewalls providing the connection between this tread and the beads,
    a carcass reinforcement extending from one bead to the other,
    a reinforcement armature for the crown, located radially to the outside of the carcass reinforcement, this crown reinforcement comprising at least two working plies provided with reinforcements,
    a circumferentially extending protuberance projecting from at least one of the sidewalls, this protuberance being limited by a radially outer upper wall and a radially inner lower wall, said upper and lower walls having upper and lower profiles, respectively, the intersection of said walls occurring along a circumferentially extending line joining a point C, on a respective sectional plane of the tire, which is located axially farthest to the outside of said protuberance, the angle α between the axial direction and a straight line tangent both to the edge of the tread and to the protuberance being less than 45°,
the tire, viewed in meridian section, is characterized in that:
    the point of intersection C of the profiles of the upper and lower walls of the protuberance is located at a distance from the equatorial plane XX which is at most equal to half the distance L between the points M of the sidewalls which are axially farthest when the tire is subjected to its rated conditions of pressure and of load, and the distance of the point C or the axis of rotation is greater than the distance of said points M relative to the same axis,
    the upper profile of the protuberance extends from the point C and joins the sidewall profile at a point K, defined as the intersection of the outer profile of the tire with the extension of the average profile of the radially outermost ply of the crown reinforcement, at least a portion of the upper profile of the protuberance adjacent to the point K extending radially to the inside of the average profile of the radially outermost ply of the crown reinforcement,
    the angle δ between a first straight line D1 and a second straight line D2 is greater than or equal to 60°, the first straight line D1 being defined as the straight line passing through the point K and tangent to the upper profile of the protuberance and the second straight line D2 being defined as the straight line passing through the point K and tangent to the profile of the sidewall which extends radially to the outside of the upper profile of the protuberance from said point K.

2. A heavy-vehicle tire according to claim 1, characterized in that, when viewed in a meridian sectional plane containing the axis of rotation, the protuberance is such that the angle α is between 32° and 37°.

3. A heavy-vehicle tire according to claim 1, characterized in that its tread is provided with a tread pattern formed by a plurality of cutouts and in that the distance between the running surface of the tire subjected to its rated conditions of use and the point of the upper profile of each protuberance located radially farthest to the outside is at least equal to the maximum depth of the cutouts of the tread pattern.

4. A heavy-vehicle tire according to claim 3, characterized in that the upper profile of the protuberance, starting from the point of connection K with the sidewall profile, is formed of a first arc of a circle of radius r extended axially towards the outside by a profile virtually parallel to the average transverse profile of the running surface of the tread.

5. A heavy-vehicle tire according to claim 1, characterized in that each protuberance is provided with a plurality of holes, each of said holes opening on to only one upper or lower wall of said protuberance in order to reduce the additional weight linked to the presence of said protuberance.

6. A heavy-vehicle tire according to claim 5, characterized in that a first series and a second series of holes are provided on at least one protuberance, the first series of holes opening solely on to the upper wall of said protuberance and the second series of holes opening solely on to the lower wall of said protuberance.

7. A heavy-vehicle tire according to claim 1, characterized in that each protuberance is provided with a first series of holes opening through the upper wall of the protuberance and a second series of holes opening through the bottom wall of the protuberance, each hole of the first series opens into at least one hole of the second series of holes, the holes opening on to the upper wall of the protuberance being oriented in a first average orientation, and the holes opening on to the lower wall of the protuberance being oriented in a second average orientation, said average directions being different so as to limit the water passing into said holes during travel.

8. A heavy-vehicle tire according to claim 1 wherein at least one protuberance is formed of a plurality of elements in relief regularly spaced apart in the circumferential direction of the tire, the length of said elements measured in the circumferential direction being at least equal to the distance between each of said elements in the circumferential direction.

9. A heavy-vehicle tire according to claim 1, characterized in that it is provided with a single protuberance arranged on the side of the tire intended to be placed on the outer side of a vehicle.

* * * * *

UNITED STATES PATENT AND TRADEMARK OFFICE
CERTIFICATE OF CORRECTION

PATENT NO. : 6,460,584 B1
DATED : October 8, 2002
INVENTOR(S) : de Labareyre

It is certified that error appears in the above-identified patent and that said Letters Patent is hereby corrected as shown below:

<u>Title page,</u>
Item [57], ABSTRACT,
Line 9, "lower, wall" should read -- lower wall --

<u>Column 7,</u>
Line 47, "of the tire" should be deleted

<u>Column 8,</u>
Lines 33, 40 and 41, "on to" should read -- onto --
Lines 49 and 51, "on to" should read -- onto --

Signed and Sealed this

Fifteenth Day of April, 2003

JAMES E. ROGAN
*Director of the United States Patent and Trademark Office*